(12) United States Patent
Nasr

(10) Patent No.: US 6,591,908 B2
(45) Date of Patent: Jul. 15, 2003

(54) HYDROCARBON PRODUCTION PROCESS WITH DECREASING STEAM AND/OR WATER/SOLVENT RATIO

(75) Inventor: Tawfik Noaman Nasr, Edmonton (CA)

(73) Assignee: Alberta Science and Research Authority, Edmonton (CA)

(*) Notice: Subject to any disclaimer, the term of this patent is extended or adjusted under 35 U.S.C. 154(b) by 17 days.

(21) Appl. No.: 09/934,963

(22) Filed: Aug. 22, 2001

(65) Prior Publication Data

US 2003/0062159 A1 Apr. 3, 2003

(51) Int. Cl.$^7$ ............ F21B 43/22; F21B 43/24; F21B 43/241
(52) U.S. Cl. ............ 166/272.3; 166/263; 166/270.1; 166/305.1
(58) Field of Search .............. 166/268, 270.1, 166/401, 402, 403, 272.1, 272.3, 272.4, 263, 305.1, 365

(56) References Cited

U.S. PATENT DOCUMENTS

| | | | | |
|---|---|---|---|---|
| 3,954,141 A | | 5/1976 | Allen et al. .............. 166/274 |
| 4,004,636 A | | 1/1977 | Brown et al. ............ 166/272 |
| 4,217,956 A | * | 8/1980 | Goss et al. .............. 166/272.3 |
| 4,266,610 A | | 5/1981 | Meister ................... 166/270.1 |
| 4,321,966 A | * | 3/1982 | Traverse et al. ......... 166/245 |
| 4,344,485 A | | 8/1982 | Butler ..................... 166/271 |
| 4,513,819 A | * | 4/1985 | Islip et al. ................ 166/272.3 |
| 4,607,695 A | * | 8/1986 | Weber ..................... 166/272.4 |
| 4,697,642 A | | 10/1987 | Vogel ...................... 166/263 |
| 4,753,293 A | | 6/1988 | Bohn ....................... 166/267 |
| 4,884,635 A | | 12/1989 | McKay et al. .......... 166/271 |
| 5,005,644 A | * | 4/1991 | Wall et al. .............. 166/270.1 |
| 5,076,363 A | * | 12/1991 | Kalpakci et al. ........ 166/270.1 |
| 5,148,869 A | | 9/1992 | Sanchez ................. 166/303 |
| 5,167,280 A | | 12/1992 | Sanchez et al. ........ 166/267 |
| 5,297,626 A | * | 3/1994 | Vinegar et al. ......... 166/271 |
| 5,413,175 A | | 5/1995 | Edmunds ............... 166/252 |
| 5,899,274 A | | 5/1999 | Frauenfeld et al. .... 166/401 |
| 6,227,296 B1 | | 5/2001 | Reppert et al. ........ 166/305.1 |

OTHER PUBLICATIONS

Singh, S. et al. *Cost Analysis of Advanced Technologies for the Production of Heavy Oil and Bitumen in Western Canada*, presented at 17$^{th}$ World Energy Congress, Houston, TX; Sep., 1998.

Shell Chemicals Data Sheet, VM&P Naphtha EC; Nov. 2000.

Shell Chemicals Data Sheet, VM&P Naphtha HT; Nov. 2000.

Nasr, T.N. and Pierce, G.E. *Steamflooding Cold Lake Oil Reservoirs Through a Bottomwater Zone: A Scaled Physical Model Study*, Society of Petroleum Engineers Western Region Meeting, Long Beach, CA., Paper No. SPE 21772 (Mar. 20–22, 1991) pp. 221–232.

Pujol, L. and Boberg, T.C. *Scaling Accuracy of Laboratory Steam Flooding Models*, California Regional Meeting of the Society of Petroleum Engineers of AIME, Bakersfield, CA Paper No. SPE 4191 (Nov. 8–10, 1972) pp. 1–12.

* cited by examiner

Primary Examiner—David Bagnell
Assistant Examiner—Jennifer H Gay
(74) Attorney, Agent, or Firm—Kurt D. Van Tassel; Deborah G. Vandenhoff; Van Tassel and Associates

(57) ABSTRACT

A method for producing hydrocarbons from a subterranean formation comprises injecting a heated injection fluid composition into the formation. The heated injection fluid composition comprises at least steam and/or hot water ("W") and a solvent ("S") into the formation. Suitable solvents include $C_1$ to $C_{30}$ hydrocarbons, carbon dioxide, carbon monoxide and combinations thereof. The heated injection fluid composition has a first W to S volume ratio, $(W:S)_1$, greater than or equal to about 5:1. The W to S volume ratio is subsequently reduced, at least once, to a different W to S volume ratio, $(W:S)_n$, wherein at least one $(W:S)_n$ is less than $(W:S)_1$ and each $(W:S)_n$ is greater than or equal to about 1.5:1 and n is in the range of from about 2 to about 12,000.

30 Claims, 9 Drawing Sheets

HYDROCARBON PRODUCTION PROCESS WITH DECREASING STEAM AND/OR WATER/SOLVENT RATIO

FIELD OF THE INVENTION

The present invention relates to the field of hydrocarbon production processes and, in particular, to steam-based hydrocarbon production processes.

BACKGROUND OF THE INVENTION

Hydrocarbons are recovered in conventional processes using fluids such as steam or solvent. For example, steam has been used in a Steam Assisted Gravity Drainage (SAGD) process as described in U.S. Pat. No. 4,344,485 (Butler, Aug. 17, 1982) and solvent has been used in a solvent-assisted gravity drainage process as described in U.S. Pat. No. 5,899,274 (Frauenfeld et al, May 4, 1999).

A combination of solvent with steam or hot water has also been proposed for increasing hydrocarbon production from subterranean formations in, for example, U.S. Pat. No. 4,753,293 (Bohn, Jun. 28, 1988) and U.S. Pat. No. 4,884,635 (McKay et al., Dec. 5, 1989).

Bohn describes a solvent-based hydrocarbon recovery process using in-situ condensation of hydrocarbon/water vapor mixture to simultaneously heat and dissolve tar in heavy oil. But the mixed vapor is a mixture of at least 40 wt. % (about 52 vol. %) hot hydrocarbon-solvent vapors and from 5 to 60 wt. % water vapor (i.e., steam) Accordingly, the volume ratio of solvent to steam in Bohn's solvent-based mixture is greater than 1.1:1 or, put another way, the steam to solvent volume ratio is less than 0.9:1. Bohn suggests maintaining the mixed solvent-to-oil ratio ("MSOR") in the range of 2:1 to about 10:1. Assuming 85% solvent recovery in the produced oil, Bohn suggests that, to produce 1 barrel of oil, his process requires from 4.5 barrels injected fluid (2.4 barrels solvent+2.1 barrels steam) to 22.4 barrels injected fluid (11.8 barrels solvent+10.6 barrels steam) when the solvent to steam ratio is 1.1:1.

Bohn teaches that if produced liquids become more viscous than desired, indicating an undesirably low MSOR in the mixing zone, the condition should be corrected either by increasing the solvent to water ratio of incoming vapor (i.e., decreasing water-to-solvent ratio of incoming vapor) or by decreasing the extent to which incoming solvent is superheated (i.e., its enthalpy in excess of P, T saturation). Accordingly, Bohn suggests that one way to correct a low MSOR is to further increase the amount of solvent injected in his solvent-based process.

U.S. Pat. No. 4,884,635 (McKay et al., Dec. 5, 1989) describes a hot water-based hydrocarbon recovery process using a mixture of hot water and hydrocarbon additive. The concentration of hydrocarbon liquid additive present in the injection mixture is in a range of about 0.1 wt. % to about 10 wt. %. Also, the aromatic content of the hydrocarbon liquid is greater than about 30%. McKay et al. teach decreasing oil recovery with increased hydrocarbon additive concentrations. Specifically, McKay et al. teach "an insubstantial improvement over the hot water flood without additive" when the hydrocarbon additive concentration was increased to 10 wt. % (col. 3:45–47). Accordingly, McKay et al. teach improved oil recovery with a minor amount of hydrocarbon additive, but oil recovery decreased as the hydrocarbon additive concentration increased to 1 wt. %, 5 wt. % and finally 10 wt. %.

Accordingly, those skilled in the art have understood from Bohn's and McKay's processes that increased oil recovery is generally obtained by either increasing the volume of the solvent in a solvent-based process or increasing the volume of steam/hot water in a steam- or hot water-based process.

Alternating solvent and steam or water injections have also been described, for example, in related patents U.S. Pat. No. 3,954,141 (Allen et al., May 4, 1976) and U.S. Pat. No. 4,004,636 (Brown et al., Jan. 25, 1977).

Allen et al. describe a multi-component hydrocarbon solvent process using a miscible gaseous/liquid hydrocarbon solvent mixture to reduce the viscosity of the oil in place for improving the oil's displacement. A slug of the solvent mixture is injected into the formation, so that substantially all of the solvent mixture is in the liquid phase. Solvent mixture injection is terminated and then the pressure in the formation is reduced to vaporize at least a portion of the gaseous component in the solvent mixture. Later in the process, an inexpensive inert drive fluid, such as water, is injected to displace the solvent slug further from the wellbore to achieve the desired contact between solvent and oil in place. The steps are then repeated, with the gaseous/liquid solvent mixture displacing the inert drive fluid and vice versa. Examples of gaseous hydrocarbon solvents include methane, ethane, propane, butane, pentane, ethylene, propylene, butylene and carbon dioxide. Examples of liquid hydrocarbon solvents are hexane, heptane and higher molecular weight aliphatic and aromatic hydrocarbons.

In the related Brown et al. patent, also disclosing a multi-component solvent process using a gaseous/liquid hydrocarbon solvent, Brown et al. teach that, after oil is produced with the solvent mixture, a hot fluid, such as steam or a mixture of steam and solvent, is injected into the formation. The hot fluid is at a temperature substantially greater than the boiling point of the gaseous component of the solvent mixture. The hot fluid causes the gaseous component to vaporize, which results in a volume expansion. In turn, the volume expansion produces a drive pressure that helps drive the oil in place toward the production well. Steam injection is continued until at least a major portion of the formation being swept exceeds the vaporization temperature of the gaseous solvent, at which point steam injection is terminated and water is injected to finish displacing oil with the solvent mixture toward the production well.

Though Brown et al. suggest injecting a steam/solvent mixture as a heated fluid to vaporize the gaseous component of the solvent slug previously injected, there is no suggestion for the relative proportions of steam and solvent to use in the steam/solvent mixtures used for vaporizing the solvent mixture previously injected. And, though there may be some limited mixing at the interface between solvent and steam or water slugs, neither Brown et al. nor Allen et al. suggest how relative proportions of solvent to steam or hot water at the interface could be altered so that either less solvent and/or less steam may be used, while recovering significant volumes of oil. Moreover, both Allen et al. and Brown et al. stress the need for a solvent recovery process in order to reduce the quantity of solvent required in their process.

Accordingly, there is a need for an improved oil production process that can increase the volume of hydrocarbon produced per unit volume of steam and/or solvent injected. Also, there is a need for an improved oil production process that can reduce the reliance on an auxiliary solvent recovery process for making use of a water/steam and solvent injection fluid economically feasible.

SUMMARY OF THE INVENTION

According to one aspect of the present invention, there is provided a predominantly water-based thermal method for producing hydrocarbons from a subterranean formation having indigenous hydrocarbons, at least one producing means that can communicate with at least a portion of the formation, at least one injection means comprising a wellbore, and a mixing zone in a near-wellbore region of the wellbore, the method comprising:

(a) selecting a first component, W, and a second component, S, wherein component W is selected from steam, hot water and combinations thereof, and component S is a solvent selected from $C_1$ to $C_{30}$ hydrocarbons, carbon dioxide, carbon monoxide and combinations thereof;

(b) introducing at least component W and component S into the at least one injection means;

(c) preparing a heated water-based injection fluid composition before, in or after the at least one injection means, the heated water-based injection fluid composition comprising at least component W and component S in a W to S volume ratio, defined by:

$$(W:S)_n = \frac{\text{(volume of component W injected in an injection sequencing interval } n\text{)}}{\text{(volume of component S injected in an injection sequencing interval } n\text{)}}$$

where the total number of injection sequencing intervals is in a range from about 2 to about 12,000, wherein the heated water-based injection fluid composition has a first W to S volume ratio, $(W:S)_1$, greater than about 5:1 and the volume of component S injected in the first injection sequencing interval, where n=1, is greater than 0;

(d) changing the ratio, at least once, from $(W:S)_1$ to a different W to S volume ratio, $(W:S)_n$, wherein at least one $(W:S)_n$ is less than $(W:S)_1$ and each $(W:S)_n$ is greater than or equal to about 1.5:1; and (e) collecting at least a portion of the indigenous hydrocarbons using the at least one producing means.

BRIEF DESCRIPTION OF THE DRAWINGS

The hydrocarbon production process of the present invention will be better understood by referring to the following detailed description of preferred embodiments and the drawings referenced therein, in which.

DETAILED DESCRIPTION OF THE PREFERRED EMBODIMENTS

Definitions

Figure 1:
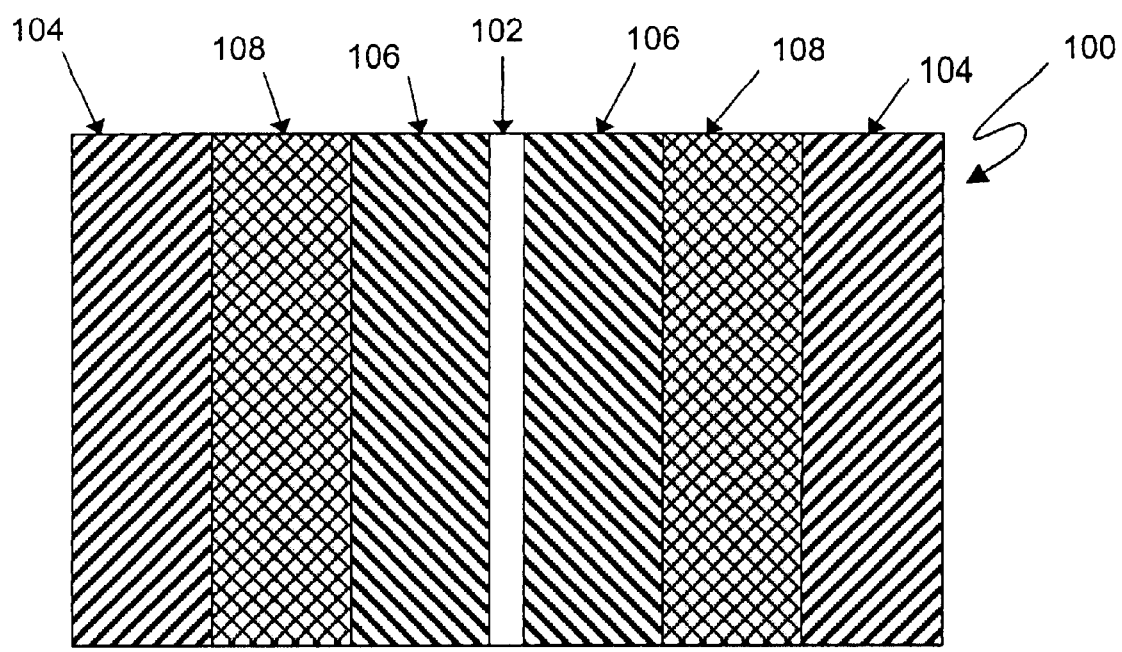
FIG. 1 is a cross-sectional schematic representation of a near-wellbore mixing zone.

By "heated injection fluid composition" ("HIFC"), I mean a fluid composition composed of at least steam and/or hot water and a solvent. The composition may be produced prior to or after injecting the steam and/or hot water and solvent into the formation.

The term "heated" is intended to be relative to the formation temperature. The HIFC should be injected at a temperature at least about 30° C. greater than the formation temperature at the bottomhole depth.

By "fluid," I mean liquid, gas or a combination thereof.

By "steam," I mean water vapor or a combination of liquid water and water vapor. It will be understood by those skilled in the art that steam may additionally contain trace elements, gases other than water vapor and/or other impurities.

By "solvent", I mean a non-aqueous fluid that is miscible, near-miscible, partially miscible or soluble (sometimes referred to as immiscible) with indigenous hydrocarbons under operating conditions to reduce viscosity and eliminate or reduce interfacial tension with indigenous hydrocarbons in a subterranean formation. A miscible solvent is capable of producing a single phase with the indigenous hydrocarbon under formation conditions. However, a near-miscible solvent may produce a multi-phase system even though the interfacial tension (or surface tension) between the solvent and indigenous hydrocarbon is relatively low. And a partially miscible or soluble solvent will produce a multi-phase system, where the solvent or indigenous hydrocarbon may be in the bulk phase. Examples of suitable solvents include, without limitation, $C_1$ to $C_{30}$ hydrocarbons, carbon dioxide ("$CO_2$"), carbon monoxide ("CO") and combinations thereof. Just a few examples of suitable $C_1$ to $C_{30}$ hydrocarbons include, without limitation, methane, ethane, propane, butane, pentane, hexane, heptane, octane, nonane, decane, undecane, dodecane, tridecane, tetradecane, and combinations thereof. But it will be apparent to those skilled in the art that $C_1$ to $C_{30}$ hydrocarbons can be selected from $C_1$ to $C_{30}$ aliphatic hydrocarbons, whether cyclic or noncyclic aliphatics, as well as aromatic hydrocarbons and combinations of suitable aliphatic and/or aromatic hydrocarbons. Some examples of suitable aromatic compounds include, without limitation, xylene, toluene, benzene and combinations thereof. Some examples of $C_1$ to $C_{30}$ hydrocarbon mixtures are diluent, kerosene, petroleum naphtha, heavy coal tar naphtha, solvent coal tar naphtha and combinations thereof. It will be understood that a $C_1$ to $C_{30}$ hydrocarbon mixture may comprise a predominant amount of one or more hydrocarbons in this range and may not contain all of the hydrocarbons in this range.

By "discrete" volume flow rate changes, I mean an increase or decrease from a substantially constant volume flow rate to a higher or lower, respectively, substantially constant volume flow rate that is held for a sufficiently long period of time before a subsequent volume flow rate change is made so that a specifically identifiable step-wise like change relative to the process' total injection time is produced.

By "continuous" increase or decrease, I mean that the flow rate is increased or decreased, respectively, at a substantially constant rate. It will be understood however that the flow rate may be adjusted in a series of finitely discrete changes over sufficiently small time intervals, relative to the process' total injection time, so as to produce a continuum of finite flow rate changes without interruption, cessation or significant holding at some fixed flow rate so as to avoid the appearance of any specifically identifiable step-wise like change, relative to the process' total injection time.

By "near-wellbore region," I mean the region in a the vicinity of a wellbore, the properties of which generally affect the flow of fluids into or out of the wellbore itself, as opposed to general reservoir flow patterns. The near-wellbore region is usually, but not limited to, a radius of about two to as much as about 50 feet around the wellbore.

By "fluid communication," I mean that the mobility of either an injection fluid or indigenous hydrocarbons in the subterranean formation, having some effective permeability, is sufficiently high so that such fluids can be produced at the producing wellbore under some predetermined operating pressure. For example, for some predetermined operating pressure, preferably, fluid communication is either enhanced or established by reducing the viscosity of the indigenous hydrocarbons. However, fluid communication also may be enhanced or established by increasing the effective permeability of the region of the formation from which indigenous hydrocarbons are produced. As more fully discussed below, means for increasing the mobility of indigenous hydrocarbons include, without limitation, introducing a heated fluid and/or a solvent into the region of the formation where the hydrocarbon fluids reside.

By "oil," I mean indigenous hydrocarbon fluids originally formed in a subterranean formation whether in a solid, liquid or gaseous state or any combination thereof.

General Discussion

The present invention relates to predominantly water-based thermal methods for producing oil from a subterranean formation. A steam-based or water-based heated injection fluid composition ("HIFC") has a first component, W, and a second component, S. Component W is selected from steam, water and combinations thereof. Component S is a solvent. The HIFC with a first W to S volume ratio ("(W:S)$_1$") greater than about 5:1, where the volume of $S_1$ is greater than 0, is produced prior to or after injecting into the subterranean formation. The W to S volume ratio is subsequently reduced, at least once, from $(W:S)_1$ to $(W:S)_n$, where n is in a range from 2 to about 12,000.

Each W to S volume ratio $(W:S)_n$ is greater than or equal to about 1.5:1, but as discussed in more detail below, there may be one or more injection intervals where the volume of $S_n$ is greater than or equal to 0.

I have discovered that by using a HIFC with a reduced W to S volume ratio, the percentage of oil recovered increased versus the oil recovered using a HIFC that is exclusively steam. Moreover, I have discovered that by using a HIFC with a reduced W to S volume ratio the percentage of oil recovered increased relative to the oil recovered with the $(W:S)_1$ HIFC. Furthermore, the volume of HIFC used to produce a barrel of oil dropped as the concentration of steam injected was reduced (i.e., the W to S volume ratio was reduced).

This discovery is surprising because the injected thermal energy is reduced when the concentration of injected steam is reduced. Specifically, the partial pressure of steam in the HIFC is reduced as the volume concentration of steam is dropped, thereby reducing the steam temperature, whether the injection pressure is changed or not. Accordingly, one skilled in the art would expect the oil recovery to be lower when the concentration of injected steam is reduced. Put another way, one skilled in the art would expect a reduced W to S volume ratio to produce a lower total oil recovery, since it is well understood within the field of thermal oil recovery methods that reducing the total amount of injected thermal energy will produce a generally commensurate reduction in total oil recovered. It is, therefore, surprising that the percentage of oil recovered increased and the volume of injected fluid required per volume of oil produced decreased, as the W to S volume ratio was reduced.

For purposes of the discussion below, the W to S volume ratio in the HIFC is:

$$(W:S)_n = \frac{\text{(volume of component W injected in an injection sequencing interval } n\text{)}}{\text{(volume of component S injected in an injection sequencing interval } n\text{)}}$$

where the total number of injection sequencing intervals can range from about 2 to about 12,000.

The volume of component W and component S used in calculating the W to S volume ratio is the equivalent fluid volume for that component at 20° C. and 1 atmosphere ("atm."). Also, the units of measure for the W and S volume flow rates having the same units must be identical for calculating the W to S volume ratio discussed and claimed below.

The HIFC can be prepared in a mixing region independently selected from: (a) a vessel before at least one injection means, (b) in-stream before at least one injection means, (c) in-stream in at least one injection means, (d) in a mixing zone after at least one injection means, but in the near-wellbore region, and (e) any combination of (a), (b), (c) and (d).

When the HIFC is prepared in a mixing vessel or in-stream (i.e., by mixing region option (a), (b) or (c)), the W to S volume ratio can be calculated using the actual volume of each component fed to the mixing vessel or the volume flow rate for each component. Determining the volume of a fluid is well known to those skilled in the art. For example, the flow rate of steam can be measured, using an orifice meter, and the equivalent liquid volume at 20° C. and 1 atm. can be determined accordingly. Likewise, a solvent can be delivered at a predetermined flow rate through a solvent injection pump to correspond to a predetermined fluid volume at 20° C. and 1 atm.

But, when the HIFC is prepared in a near-wellbore mixing zone in the formation (i.e., by mixing region option (d)), the W to S volume ratio is estimated by reservoir simulation techniques. As discussed in more detail below, the W to S volume ratio and the size and shape of a near-wellbore mixing zone is dependent on a number of factors, including, without limitation, formation properties, injection fluid properties and process variables. Reservoir simulation techniques, therefore, can be used to estimate the injection period length and respective injection volumes for alternating injections of W and S to obtain the desired W to S volume ratio.

A cross-sectional view of a near-wellbore mixing zone from a vertical perspective, is illustrated schematically in FIG. 1. As illustrated in FIG. 1, alternate injections of steam or hot water and solvent into a formation's near-wellbore region 100 through wellbore 102 may result in a W-zone 104 where the injection fluid is predominantly steam and/or hot water and an S-zone 106 where the injection fluid is predominantly solvent. But, at the interface between the W-zone 104 and the S-zone 106, there is a mixing zone 108 where both injected steam and/or hot water and injected solvent are present. Therefore, when using alternate injections of component W and component S to practice the present invention, the W to S volume ratio should be determined from the volume of each component in the mixing zone 108, which is in the near-wellbore region.

For convenience, the width of the W-zone 104, S-zone 106 and mixing zone 108 are illustrated in FIG. 1 as being equal in cross-section. However, it will be understood that the size and shape of the near-wellbore region 100 and the mixing zone 108 is dependent on a number of factors, including, without limitation, formation properties, injection fluid properties and process variables. Examples of formation properties include, without limitation, porosity, permeability, water saturation, oil saturation, formation fluid viscosity, degree of homogeneity within and between one or more formation layers, temperature, pressure, capillary pressure, and lithology. Examples of injection fluid properties include, without limitation, temperature, pressure, injection rate, injection time, and the fluid's mobility through the formation. Examples of process variables include, without limitation, well spacing, injection depth, injection temperature, injection pressure, injection history and production history.

The size of the near-wellbore region 100 and the mixing zone 108 and, therefore, the W to S volume in the mixing zone 108 may be estimated using suitable reservoir simulation techniques known to those skilled in the art. A number of different reservoir simulation software packages have been developed using some or many, if not all, of the factors listed above to characterize a formation and it's near-wellbore region. However, as discussed previously under the Background Discussion, many steam injection processes focus on displacing one injection fluid (e.g., solvent) with another injection fluid (e.g., a steam). Accordingly, the mixing zone properties may not be accounted for in some reservoir simulation packages. Or, if mixing properties are factored in they may be considered only in regions well outside the near-wellbore region, since, again, the focus of the previous techniques is primarily on producing an oil displacement or drive process. Also, certain reservoir simulation software may be better suited than others for some processes or some formations. Accordingly, it will be understood by those skilled in the art to select a suitable software package in accordance with at least some of the factors discussed above as well as any other factors that may be considered pertinent to practicing the invention in a specified formation and operation.

An array of thermal reservoir simulation software is available. For example, without limitation, thermal reservoir simulation software that may be used for estimating the W to S volume ratio in the mixing region may be obtained from Computer Modelling Group, Ltd. (Calgary, Alberta, Canada), GeoQuest (Houston, Tex., U.S.A.), Landmark Graphics Corporation (Houston, Tex., U.S.A.) and Roxar, Inc. (Houston, Tex., U.S.A.). Again, those skilled in the art can select the appropriate software package for a specific application.

When calculating the W to S volume ratio, components in the HIFC other than components W and S are not used in calculating the W to S volume ratio.

For example, the W to S volume ratio of an HIFC consisting of 300 $m^3$/day of steam and a $N_2/CO_2$ mixture at 80/20 vol. %, respectively, at 750 $m^3$/day would be 2:1 where the volume flow rate of component W is 300 $m^3$/day and the volume flow rate of component S is 150 $m^3$/day (750×0.2). So, the volume flow rate of $N_2$ is not used for calculating the W to S volume ratio.

Examples of suitable solvents include, without limitation, $C_1$ to $C_{30}$ hydrocarbons, $CO_2$, CO and combinations thereof that can produce either a miscible, near-miscible, partially miscible or soluble single or multi-phase system with the oil in place under the operating and formation conditions. Just a few examples of suitable $C_1$ to $C_{30}$ hydrocarbons include, without limitation, methane, ethane, propane, butane, pentane, hexane, heptane, octane, nonane, decane, undecane, dodecane, tridecane, tetradecane, diluent, kerosene, naphtha and combinations thereof. But it will be apparent to those skilled in the art that $C_1$ to $C_{30}$ hydrocarbons can be selected from $C_1$ to $C_{30}$ aliphatic hydrocarbons, whether cyclic or non-cyclic aliphatics, as well as aromatic hydrocarbons and combinations of suitable aliphatic and/or aromatic hydrocarbons. Some examples of suitable aromatic compounds include xylene, toluene, benzene and combinations thereof.

The solvent may be miscible, near-miscible, partially miscible or soluble with the oil being produced. A miscible fluid would produce a true solution with the oil in place under operating and formation conditions, while a near-miscible fluid would likely produce a two-phase system with the oil in place, but would have the appearance of a solution between the oil and near-miscible fluid. And a partially miscible or immiscible fluid will produce a multi-phase system, with either a solvent or hydrocarbon bulk phase. In any case, however, the solvent can be separated and recovered for re-use in the inventive process as appropriate. Nonetheless, because the solvent as well as steam/hot water can be efficiently used in the inventive process, it can be deployed so that an auxiliary solvent recovery process is not required to produce an economic oil recovery rate.

When preparing a HIFC, solvent may be added to the steam or hot water in a substantially pure form or it may be added in the form of a solvent/non-solvent mixture. As used herein, a "solvent/non-solvent mixture" is a mixture of solvent and at least one non-solvent fluid such as water, steam or other non-solvent that is a non-aqueous component.

When the HIFC is prepared with a substantially pure form of solvent, the total volume of solvent is used for calculating the W to S volume ratio.

But, when a solvent/non-solvent mixture is used for preparing an HIFC, only the volume of solvent(s) is used as the volume of component S for calculating the W to S volume ratio. And likewise, when a solvent/non-solvent mixture contains water and/or steam, the volume of water and/or steam present in the solvent/non-solvent mixture is added to the volume of component W.

For example, one suitable source for $CO_2$ is flue gas, which comprises $CO_2$, steam and other fluids, such as, without limitation, $N_2$, $NO_x$, $SO_x$ or ash. The compounds and relative amounts of those compounds in flue gas is dependent on, for example, without limitation, fuel, combustion gas and combustion temperature. Therefore, when using flue gas as a source of $CO_2$, the volume of $CO_2$ in flue gas should be used for determining the amount of component S and the volume of steam in the flue gas should be added to the volume of component W. Fluids other than steam, water, $CO_2$ and any other solvent present in the flue gas are not used in the W to S volume ratio calculation.

As another example, syngas may be used as a source of CO. Syngas is a mixture of CO and $H_2$. The volume of CO should be used for determining the amount of component S. However, the $H_2$ volume is not included in the calculation of the W to S volume ratio, since it is neither a solvent nor aqueous fluid.

Those skilled in the art will understand that a formation's temperature is dependent on its location, depth and time of year. For example, some formations in Alberta, Canada are at a temperature of from about 6° C. to about 8° C. in winter. Accordingly, the term "heated" is intended to be relative to the formation temperature. Therefore, HIFC should be injected at a temperature at least about 30° C. greater than the formation temperature at the bottomhole depth. Preferably, the HIFC is injected at a temperature in a range from about 40° C. to about 360° C. More preferably, the HIFC is injected at a temperature in a range from about 80° C. to about 340° C. Most preferably, the HIFC is injected at a temperature in a range from about 150° C. to about 330° C.

The HIFC is injected at a pressure greater than the reservoir pressure so that the injected fluid can enter the formation. Of course, the reservoir pressure is primarily dependent on the depth of the formation and thus is generally larger as the formation depth increases. Nonetheless, preferably, the HIFC injection pressure used is just slightly above (i.e., about 10 to 20% over) the reservoir pressure to reduce the risk of fracturing. Even though the surprising result was found at a relatively constant injection pressure, it does not mean that the injection pressure must be maintained at a constant pressure. Accordingly, although the W to S ratio in the HIFC will change in the inventive process, the injection pressure may be changed or kept substantially constant, but at a pressure below formation fracture pressure.

For the purposes of determining the initial W to S volume ratio, $(W:S)_1$, for the process of the present invention, the volume of S is greater than 0 and $(W:S)_1$ is greater than about 5:1. For example, $(W:S)_1$ may be in a range from about 5:1 to about 1,000:1. Preferably, $(W:S)_1$ is in a range from about 5:1 to about 100:1. More preferably, $(W:S)_1$ is in a range from about 5:1 to about 50:1. Most preferably, $(W:S)_1$, is in a range from about 10:1 to about 25:1. But as discussed below, the process of the present invention may be used following a steam-only or water-only, a solvent-only or a steam/solvent or water/solvent injection process.

The W:S volume ratio must be reduced at least once, from the initial W to S volume ratio, $(W:S)_1$, but is preferably reduced multiple times in practicing the inventive process. However, in practicing the inventive process, the W to S volume ratio may be increased either before and/or after the W to S volume ratio is reduced, provided the W to S volume ratio is reduced at least once over the life of the process. But, in any case, the last injection sequencing interval "F" with a reduced W to S volume ratio has a final W to S volume ratio, $(W:S)_F$, in a range from about 1.5:1 to about 10:1. Preferably, $(W:S)_F$ is in a range from about 1.5:1 to about 5:1. More preferably, $(W:S)_F$ is in a range from about 1.5:1 to about 2:1.

And though it may be desirable in only certain applications of the invention, it is possible to increase the W to S ratio, after $(W:S)_F$, to a value greater than or equal to $(W:S)_1$. Or, as discussed more fully below, it may be desirable for certain operational reasons to switch to a solvent-only or substantially solvent-based process after $(W:S)_F$.

As discussed above, $(W:S)_1$ is changed at least once to a different W to S volume ratio $(W:S)_n$, where at least one $(W:S)_n$ is less than $(W:S)_1$ but greater than or equal to about 1.5:1. However, the actual number of injection sequencing intervals can depend on a number of factors including for example, without limitation, project life, operator preference, productivity, flow regime, $(W:S)_1$, and the like. For example, n can be 60 for a 15-year project using discrete changes 4 times per year or n could be 180 for a 15-year project using monthly discrete changes. Preferably, n is in a range from about 3 to about 6,000. More preferably, n is in a range from about 6 to about 1,200.

The improved oil recovery efficiency arises from a surprising and unexpected result that appears to be produced from some synergistic action between the injection flow regime for steam and/or hot water and solvent. More specifically, it appears that the improved oil recovery occurs even though the volume of steam and/or hot water injected is reduced, while solvent volume is either maintained or increased.

Steam and hot water increase oil mobility by heat, which reduces viscosity. On the other hand, solvent reduces viscosity and increases oil mobility by eliminating or significantly reducing the interfacial tension between solvent and oil. But it has been generally accepted among enhanced oil recovery experts that as injected volume of steam or hot water is lowered, substantial volumes of solvent are required (i.e., $\leq 0.9:1$ W to S volume ratio with a solvent density=0.6 g/mL and $\leq 1.1:1$ W to S volume ratio with a solvent density=0.75 g/mL), since the solvent's ability to enhance oil's mobility does not work as efficiently, on a per unit volume basis, as steam or hot water. Consequently, the improved oil recovery efficiency produced with the inventive process is surprising since a drop in the amount of steam and/or hot water injected, while injected solvent volume is maintained or increased, would be expected to reduce oil recovery efficiency. Moreover, thermal energy is generally understood to be particularly important to enhancing the oil's mobility when the steam (or hot water) to solvent volume ratio is above 1 to 1. Therefore, until the discovery of my invention, a higher W to S volume ratio was considered particularly important for ensuring there was sufficient heat to the formation for enhancing oil mobility, most particularly when lower solvent volumes (i.e., $\geq 1.5:1$ W to S volume ratio) were used.

So again, in a mixed steam or hot water/solvent injection process, it would be reasonably expected that the oil recovery efficiency would drop accordingly as the volume of injected steam and/or hot water was reduced, particularly since injecting lower solvent volumes (i.e., ≧1.5:1 W to S volume ratio) would be considered insufficient to alter the oil's mobility absent sufficient heat to vaporize the solvent (see, for example, Brown et al.'s discussion in U.S. Pat. No. 4,004,636 regarding the importance of injecting sufficient steam volume to vaporize liquid solvent in the formation). Nonetheless, surprisingly the inventive process provides improved oil recovery efficiency, without requiring substantial volumes of solvent, while at the same time, uses lower steam and total HIFC volumes for producing a barrel of oil versus previous mixed steam/solvent or hot water/solvent enhanced oil recovery processes.

Flow Regimes

As discussed above, the HIFC can be prepared in a mixing region independently selected from: (a) a vessel before at least one injection means, (b) in-stream before at least one injection means, (c) in-stream in at least one injection means, (d) in a mixing zone after at least one injection means, but in the near-wellbore region, and (e) any combination of (a), (b), (c) and (d). In any case, some different non-limiting examples of flow regimes useful for practicing the invention are illustrated in FIGS. 2 to 10B and described below.

But, generally, practicing the invention requires at least a flow regime that produces at least one decrease in the W to S volume ratio from an initial W to S ratio, $(W:S)_1$, which is greater than about 5:1, to a different W to S ratio, $(W:S)_n$, which is greater than or equal to about 1.5:1, where n is in a range of from 2 to about 12,000. Nonetheless, there may be one or more intervening injection intervals where the W to S ratio actually exceeds the $(W:S)_1$, whether a ratio exceeding $(W:S)_1$ is produced by holding injected steam volume constant, while solvent volume is decreased (see e.g., FIGS. 9A and 9B) or by increasing the injected steam volume, while the solvent volume is held constant (see e.g., FIGS. 10A and 10B). However, to optimize oil recovery efficiency, preferably the flow regimes generally produce an overall progression to a reduced W to S volume ratio. But again, in practicing the invention, ultimately the W to S volume ratio must drop below $(W:S)_1$ at least once and all W to S ratios subsequent to $(W:S)_1$ must be greater than or equal to about 1.5:1.

Figure 2:
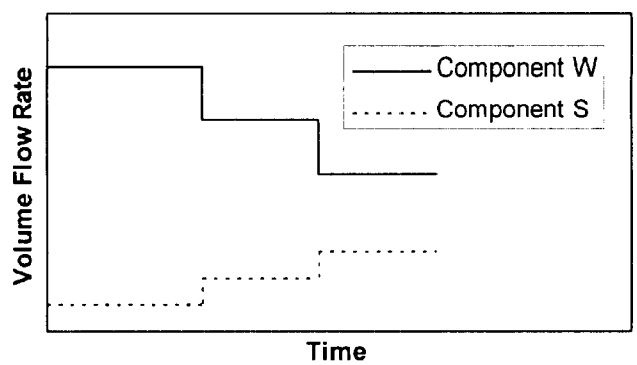
FIG. 2 illustrates one embodiment of a flow regime where a steam and/or hot water volume flow rate is decreased and a solvent volume flow rate is increased in a discrete manner.

As illustrated in the flow regime of FIG. 2, the component W volume flow rate is decreased ("W-decrease") in a discrete manner, while the component S volume flow rate is increased ("S-increase") in a discrete manner. The relative sizes of the W-decrease and S-increase may be the same or, as illustrated in FIG. 2, the S-increase may be a fraction of the W-decrease. In the embodiment illustrated in FIG. 2, the S-increase occurs concurrently with the W-decrease. Alternatively, the S-increase may occur at a different time than the W-decrease, at the same or different frequency. Also, in the embodiment illustrated in FIG. 2, the relative size of discrete injection sequencing intervals for W-decrease and S-increase are independently substantially equal. However, the magnitude of W-decrease and/or S-increase may change during the process. Each injection sequencing interval may be conducted for a period of time ranging from about several days to about several months.

Figure 3:
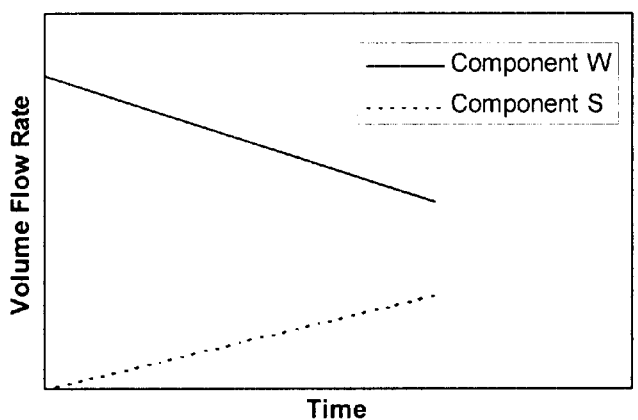
FIG. 3 illustrates another embodiment of a flow regime where the steam and/or hot water volume flow rate is decreased and the solvent volume flow rate is increased in a substantially continuous manner.

In the embodiment illustrated in FIG. 3, both the W-decrease and the S-increase are substantially continuous. In the FIG. 3 embodiment, the rate of W-decrease is greater than the rate of S-increase. Alternatively, the W-decrease and S-increase may be at the same rate. In a further alternative embodiment, the S-increase rate is greater than the W-decrease rate. Though FIG. 3 illustrates a constant decrease rate throughout, one or both decrease rates may be changed one or more times during the process.

Figure 4A:
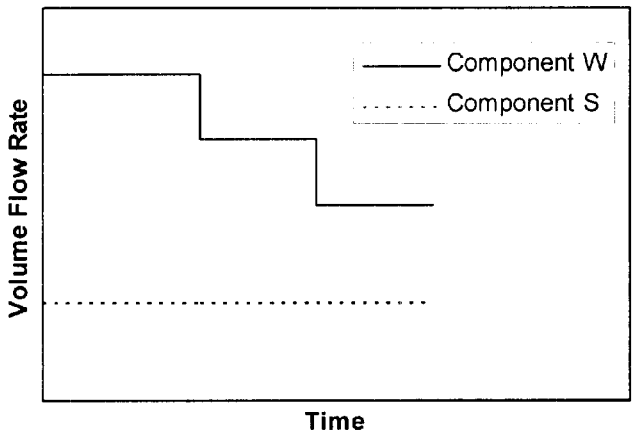
FIGS. 4A and 4B illustrate flow regime embodiments where the volume flow rate of one component of the heated injection fluid composition ("HIFC") is substantially constant while the other is changed in a discrete manner.
Figure 4B:
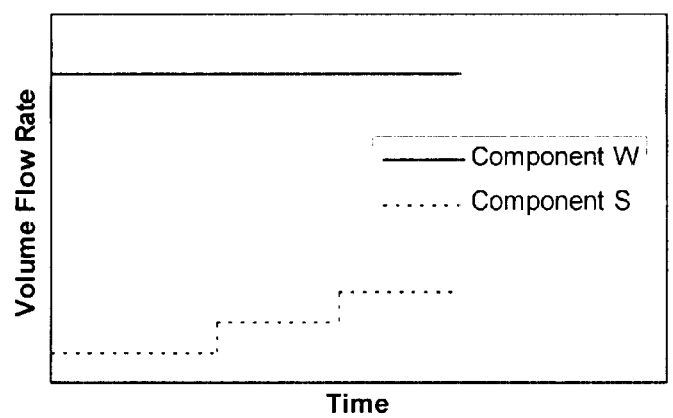

FIG. 4A illustrates a flow regime embodiment where the component S volume flow rate is substantially constant, while the component W volume flow rate is decreased in a discrete manner. Conversely, FIG. 4B illustrates a flow regime embodiment where the component W volume flow rate is substantially constant, while the component S volume flow rate is increased in a discrete manner.

Figure 5A:
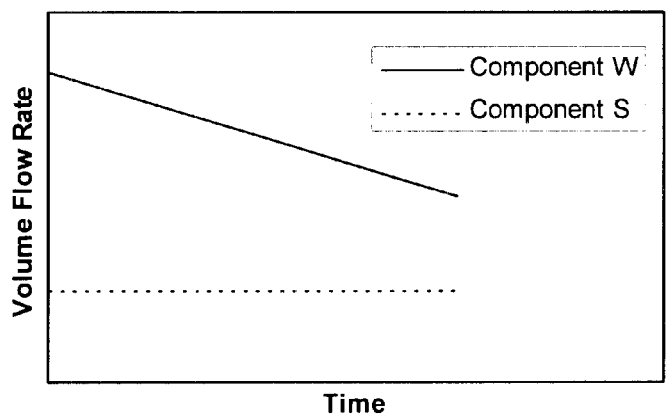
FIGS. 5A and 5B illustrate flow regime embodiments where the volume flow rate of one component of the HIFC is substantially constant while the other is changed in a substantially continuous manner.
Figure 5B:
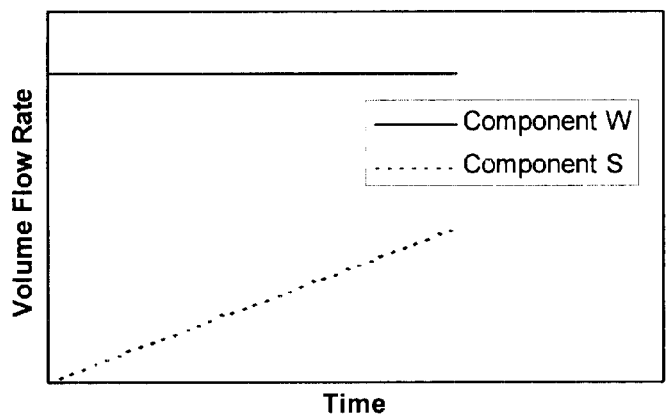

Likewise, FIGS. 5A and 5B illustrate embodiments where the volume flow rate of one component is substantially constant, while the other component is decreased or increased, respectively, in a substantially continuous manner.

Figure 6A:
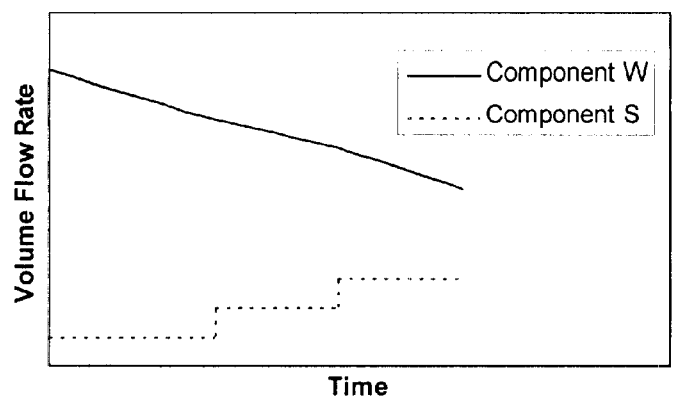
FIGS. 6A and 6B illustrate alternative embodiments with a combination of discrete changes and substantially continuous changes.
Figure 6B:
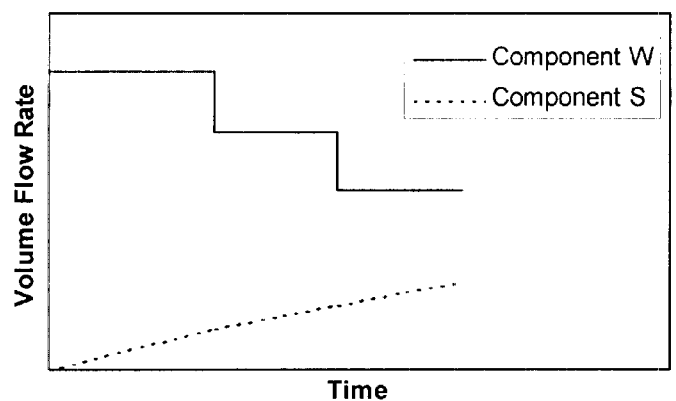

FIGS. 6A and 6B illustrate flow regimes with a combination of discrete changes and continuous changes. Specifically, FIG. 6A illustrates an embodiment where the W-decrease is substantially continuous, while the S-increase is discrete. And FIG. 6B illustrates an embodiment where the W-decrease is discrete, while the S-increase is substantially continuous.

Figure 7A:
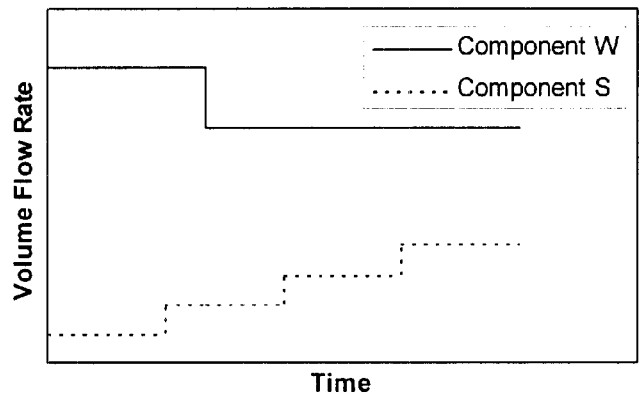
FIGS. 7A and 7B illustrate other embodiments where both steam and/or hot water and solvent volume flow rates change in a discrete manner but one volume flow rate is substantially constant after a period of time.
Figure 7B:
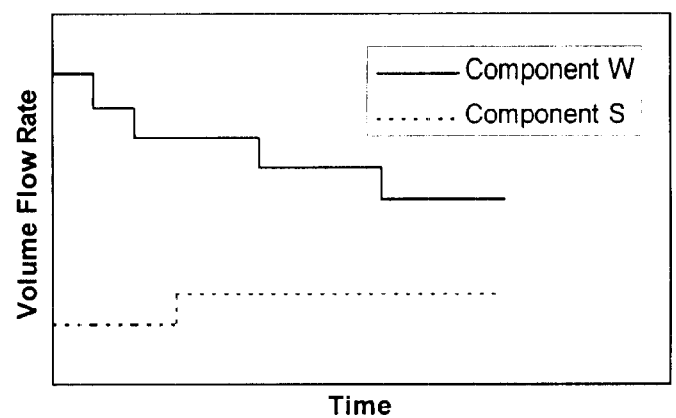

FIGS. 7A and 7B are further embodiments where both the S-increase and W-decrease are performed in a discrete manner. But in the FIG. 7A flow regime, the component W volume flow rate is held substantially constant after a discrete decrease, while the S-increase continues in a discrete manner. Conversely, in the embodiment illustrated in FIG. 7B, the component S volume flow rate is held substantially constant after a discrete increase, while the W-decrease continues in a discrete manner.

Figure 8A:
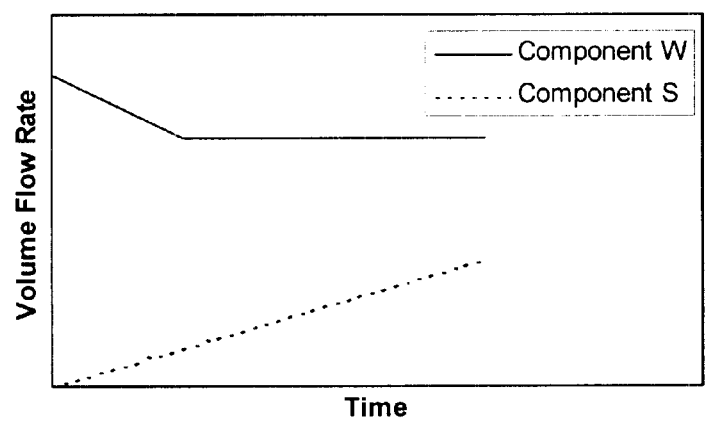
FIGS. 8A and 8B illustrate alternative embodiments where both steam and/or hot water and solvent volume flow rates change in a substantially continuous manner, but the volume flow rate of one component is held substantially constant after a period of time.
Figure 8B:
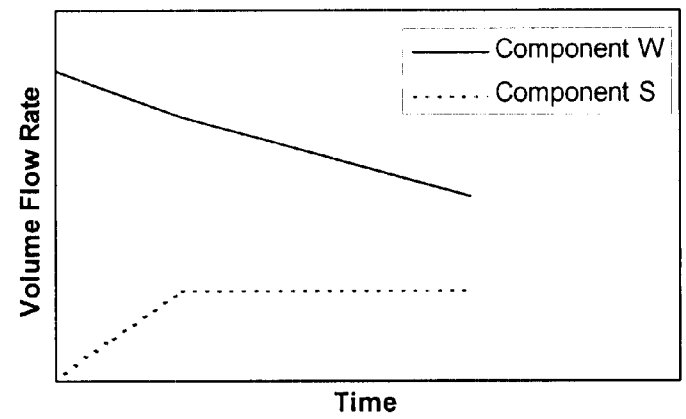

Likewise, FIGS. 8A and 8B illustrate flow regimes where both the S-increase and W-decrease are performed in a substantially continuous manner. But in the FIG. 8A flow regime, the component W volume flow rate is held substantially constant after a period of time, while the S-increase continues in a substantially continuous manner. Conversely, in the embodiment illustrated in FIG. 8B, the component S volume flow rate is held substantially constant after a period of time, while the W-decrease continues in a substantially continuous manner.

As alternatives (not shown) to the embodiments in FIGS. 7A, 7B, 8A and 8B, the volume flow rate of component S or W may be constant initially, followed by a discrete or continuous S-increase or W-decrease, respectively. As further alternatives (not shown) to FIGS. 7A, 7B, 8A and 8B, the volume flow rate of one component, for example component S, may be constant, with a discrete or continuous W-decrease, followed by a discrete or continuous S-increase and constant W volume flow rate.

In the embodiments illustrated in FIGS. 2 to 8B, the flow regimes have an injection sequencing interval wherein $(W:S)_{n+1}$ is less than $(W:S)_n$ and each subsequent W to S volume ratio is different and lower than the preceding W to S volume ratio. Each W to S volume ratio the flow regimes illustrated in FIGS. 2 to 8B is greater than or equal to about 1.5:1.

Figure 9A:
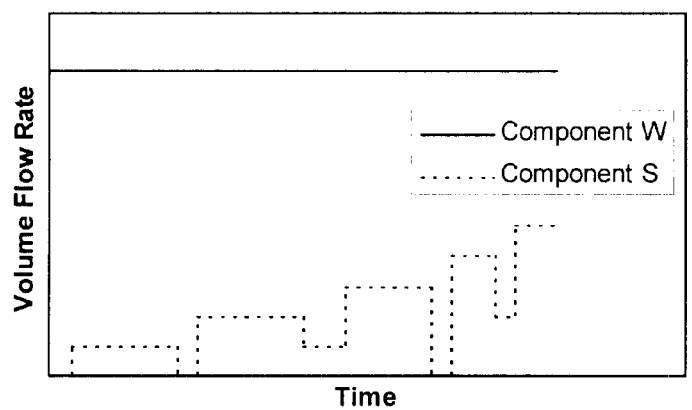
FIGS. 9A and 9B illustrate embodiments where the steam volume flow rate is substantially constant and the solvent volume flow rate generally progresses to a reduced steam and/or hot water to solvent volume ratio but where there are injection intervals with an increased steam and/or hot water to solvent volume ratio.
Figure 9B:
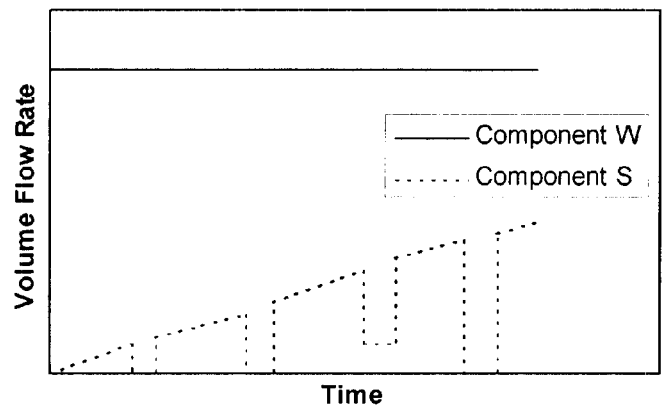

FIGS. 9A and 9B illustrate alternative embodiments where the discrete and continuous S-increases, respectively, generally produce an overall progression to a reduced W to S volume ratio. But, in the embodiments shown in FIGS. 9A and 9B, there are injection sequencing intervals during which the W to S volume ratio is higher than the W to S volume ratio for the preceding period. For example, the solvent volume flow rate may be discontinued completely for a period of time so that only steam is injected. Or the solvent volume flow rate may be reduced for a period of time. In either case, the W to S volume ratio is increased for those injection sequencing intervals. As shown in FIGS. 9A and 9B, the W to S volume ratio is then decreased to a ratio less than the W to S volume ratio prior to the increased W to S volume ratio injection sequencing interval.

Figure 10A:
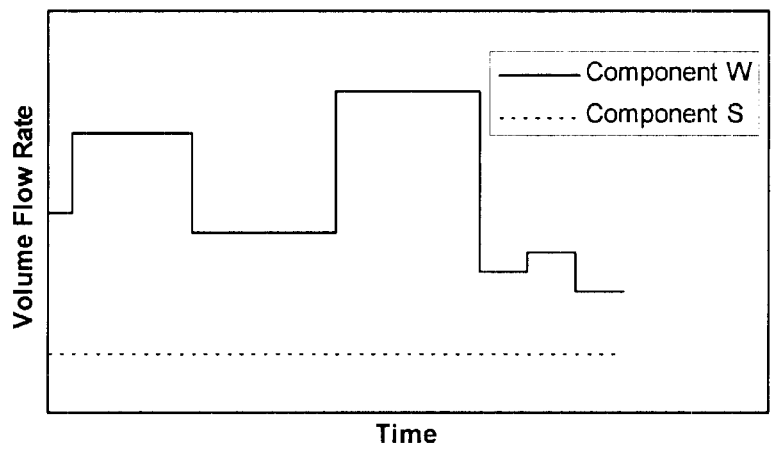
FIGS. 10A and 10B illustrate embodiments where the solvent volume flow rate is substantially constant and the steam volume flow rate generally progresses to a reduced steam and/or hot water to solvent volume ratio but where there are injection intervals with an increased steam and/or hot water to solvent volume ratio.
Figure 10B:
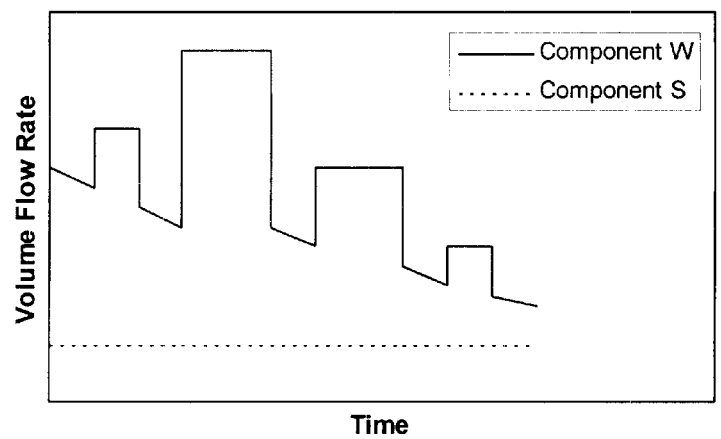

Conversely, FIGS. 10A and 10B illustrate alternative embodiments where the discrete and continuous W-decreases, respectively, generally produce an overall progression to a reduced W to S volume ratio. But, in the embodiments shown in FIGS. 10A and 10B, there are injection sequencing intervals during which the W to S volume ratio is higher than the W to S volume ratio for the preceding period. For example, the steam volume flow rate may be increased to a value greater than the initial steam volume flow rate for a period of time, thereby increasing the W to S volume ratio for those injection sequencing intervals. As shown in FIGS. 10A and 10B, the W to S volume ratio is then decreased to a ratio less than the W to S volume ratio prior to the increased W to S volume ratio injection sequencing interval.

FIGS. 9A, 9B, 10A and 10B illustrate embodiments where the W to S volume ratio after each increased W to S volume ratio injection interval is less than the W to S volume ratio prior to the increased W to S volume ratio interval.

However, there may be two or more different W to S volume ratio intervals before the W to S volume ratio is reduced to a value less than the W to S volume ratio preceding the first W to S volume ratio increase. In this case, a flow regime has at least one injection sequencing interval wherein at least one $(W:S)_{n+x}$ is greater than $(W:S)_n$ and $(W:S)_{n+x+1}$ is less than $(W:S)_n$, where x is in the range from 1 to 5. Each W to S volume ratio is greater than or equal to about 1.5:1.

Also, the flow regimes in FIGS. 2 to 8B may be combined with one or more injection sequencing intervals wherein at least one $(W:S)_{n'+x}$ is greater than $(W:S)_{n'}$ and $(W:S)_{n'+x+1}$ is less than $(W:S)_{n'}$, where x is in the range from 1 to 5. Again, each W to S volume ratio is greater than or equal to about 1.5:1.

It will be understood that the W to S volume ratio reduction may be accomplished using any one or a combination of the flow regimes illustrated in FIGS. 2 to 10B.

In another embodiment, not illustrated in the drawings, injection of steam or hot water is discontinued completely after $(W:S)_1$ is reduced to the target W to S volume ratio. In this embodiment, the process is converted from a steam and/or water-based process to a solvent-only process. By "solvent-only," we mean that there is no steam and/or water in the injected fluid. However, it will be understood that other components, for example $N_2$, $CO_2$ and/or $H_2$, may be present in the solvent injection fluid. One advantage of using a steam-based or hot-water-based process before converting to a solvent-only process is that the formation is first heated with less expensive steam and/or hot water to increase oil mobility. Conversely, if used initially, predominantly solvent processes generally require a larger volume of solvent to achieve the same oil mobility produced by steam and/or hot water. But, after a period of time, for example about 1 year, a steam-based or hot-water-based process will provide sufficient stored heat in the formation to make a solvent-only process more economical by reducing the amount of solvent required to efficiently increase oil mobility.

Once the process is converted from a steam-based or hot-water-based process to a solvent-only process, the volume flow rate of solvent is preferably greater than or equal to the solvent volume flow rate in the HIFC and preferably less than or equal to the total volume flow rate of the HIFC.

In one embodiment of the invention, the HIFC may be injected into an injection well by first mixing components W and S, preferably in the gas phase, prior to injection. In other embodiments of the invention, separate lines for components W and S can be used to independently, but concurrently, introduce steam and/or hot water and solvent into the injection well, where the steam and/or hot water and solvent will mix in-stream at the surface prior to injection or in-stream in the wellbore after injection. A separate solvent injection line is particularly suitable for retrofitting existing processes. Also, it may be easier to monitor the solvent flow rate when separate steam and/or hot water and solvent lines are used to inject the HIFC.

Also, as discussed above, component W injections may be alternated with injections of component S or a mixture of component S and component W. In this embodiment, the alternating injection intervals are sufficiently small to produce the target W to S volume ratio in-situ in a mixing zone 108 (illustrated in FIG. 1) in the near-wellbore region around the injection well.

Reservoir simulation software can be used to determine the appropriate length and volume of each alternating injection for a target W to S volume ratio in the mixing zone 108.

In effect, the mixing zone in the near-wellbore region in the formation becomes an in-situ "mixing pot" for injected components W and S. It will therefore be apparent to one skilled in the art that it is not necessary to pre-mix components W and S prior to injection nor is it necessary to co-inject components W and S to achieve the advantages of the present invention.

As shown in the Example, when appropriate, a substantial portion of the solvent may be recovered in the produced oil. Advantageously, all or a portion of the solvent may be separated from the produced oil, for example, for recycle to the HIFC. But, it may also be desirable to leave all or a portion of the solvent in the produced oil to assist in pipeline transport.

Applications

Oil is produced by injecting a HIFC into the injection well and producing the oil from the producing well. In the present invention, oil is produced from a subterranean formation having at least one wellbore, but preferably two or more wellbores.

In a single wellbore embodiment, the wellbore may contain, therein, one or more well conduits. Where a single well conduit is used in a single wellbore, the conduit could be used sequentially as a means for injecting a HIFC and means for producing oil. In such a single wellbore embodiment, preferably, multiple well conduits are used in the single wellbore and each conduit may be used either sequentially or concurrently to inject a HIFC and produce oil.

In the multiple wellbore embodiment, there are at least two wellbores, each of which may contain one or more well conduits and each conduit may be used either sequentially or concurrently to inject a HIFC and produce oil. In such a multiple wellbore embodiment, preferably, there is an injection wellbore having only one injection conduit and a producing wellbore having only one producing conduit, wherein the HIFC and oil are, respectively, injected and produced substantially concurrent with each other.

For ease of discussion, reference herein to an injection well and a producing well includes single wellbore and multiple wellbore embodiments.

In the case of either the single or multiple wellbore embodiments of the invention, if fluid communication is not already established, it must be established, at some point in time, between the producing wellbore and a region of the subterranean formation containing the oil affected by the injected HIFC.

The present invention may be initiated with steam- and/or hot water-only, solvent-only, a mixture of steam and solvent or a mixture of hot water and solvent. The present invention may also be applied to retrofit existing processes, including steam- and/or hot water-only, solvent-only and combined steam and/or hot water and solvent processes. Examples of steam-only processes are described in U.S. Pat. No. 4,344,485 (Butler, Aug. 17, 1982) and U.S. Pat. No. 5,413,175 (Edmunds, May 9, 1995). Examples of solvent-only processes include U.S. Pat. No. 5,899,274 (Frauenfeld et al., May 4, 1999) and U.S. Pat. No. 5,167,280 (Sanchez et al., Dec. 1, 1992). And examples of combined steam and solvent processes are described in U.S. Pat. No. 4,753,293 (Bohn, Jun. 28, 1988), U.S. Pat. No. 5,148,869 (Sanchez, Sep. 22, 1992) and U.S. Pat. No. 4,697,642 (Vogel, Oct. 6, 1987). An example of a combined hot water and solvent process is described in U.S. Pat. No. 4,884,635 (McKay et al., Dec. 5, 1989).

In one preferred embodiment, the present invention may be used to produce heavy, viscous oil from subterranean reservoirs, such as those found in the Oil Sands of Alberta, Canada. Examples of suitable oil production processes, in which the invention may be used, include, without limitation, cyclic steam stimulation ("CSS"), steam-assisted gravity drainage ("SAGD"), steam flooding and hot water flooding processes.

In a typical SAGD process, initial thermal communication between an injection well and a producing well is established by injection of steam or low viscosity hydrocarbon solvent into one of the wells and production of oil from the other well. Alternatively, heated fluid may be circulated in one or both wells. In a further alternative, a combination of these methods may be employed. In reservoirs where communication between an injection well and a producing well is already established, the SAGD process can be implemented immediately. Steam is then injected into the injection well to heat the formation. As the steam condenses, oil is mobilized by liberated heat from condensing steam and drain by gravity to the producing well. Oil is produced continuously through the producing well at rates which result in substantially separate oil and condensate flowpaths without excessive steam bypass. In a preferred embodiment of the SAGD process, the injection and producing wells are superposed horizontal wells, spaced about 5 meters apart, near the bottom of the formation. However, it is not required to operate in the preferred embodiment to practice the present invention.

CSS is also commonly referred to as a "huff and puff" process. Steam is injected into the formation, commonly at a pressure above the fracture pressure, through a vertical well for a period of time. The well is then shut in for several days to several months, referred to as the "soak" period. Then the well is opened to produce heated oil and steam condensate until the production rate declines. The entire cycle is then repeated. In the course of this process, an expanding oil depleted zone is gradually developed. Oil draining from the heated zone is produced through the well during the production phase and is replaced, at least in part, with steam during the injection phase. Thereafter, newly injected steam, together with steam already present, moves through the depleted zone to its boundary, to supply heat to the cold oil at the boundary.

In steam or hot water flooding, steam or hot water is injected through an injection well to thermally drive the oil to the producing well. The steam or hot water heats the oil to lower the viscosity and mobilize the oil. The mobilized oil is driven by injected steam or hot water to the producing well.

The present invention may be practiced in a variety of arrangements of injection and producing wells. For example, without limitation, the invention may be practiced with (a) a single horizontal well, used either simultaneously as injection and producing wells or alternating injection and producing wells, (b) two or more horizontal wells, at least one acting as an injection well and at least one acting as a producing well, which can be arranged with one disposed directly above the other, offset horizontally from the other, perpendicular or at another angle to the other, etc., (c) two or more vertical wells, at least one being used as an injection well and at least one being used as a producing well, or (d) a combination of one or more horizontal wells and one or more vertical wells.

The following non-limiting example of an embodiment of the present invention is provided for illustrative purposes only.

EXAMPLE

Figure 11:
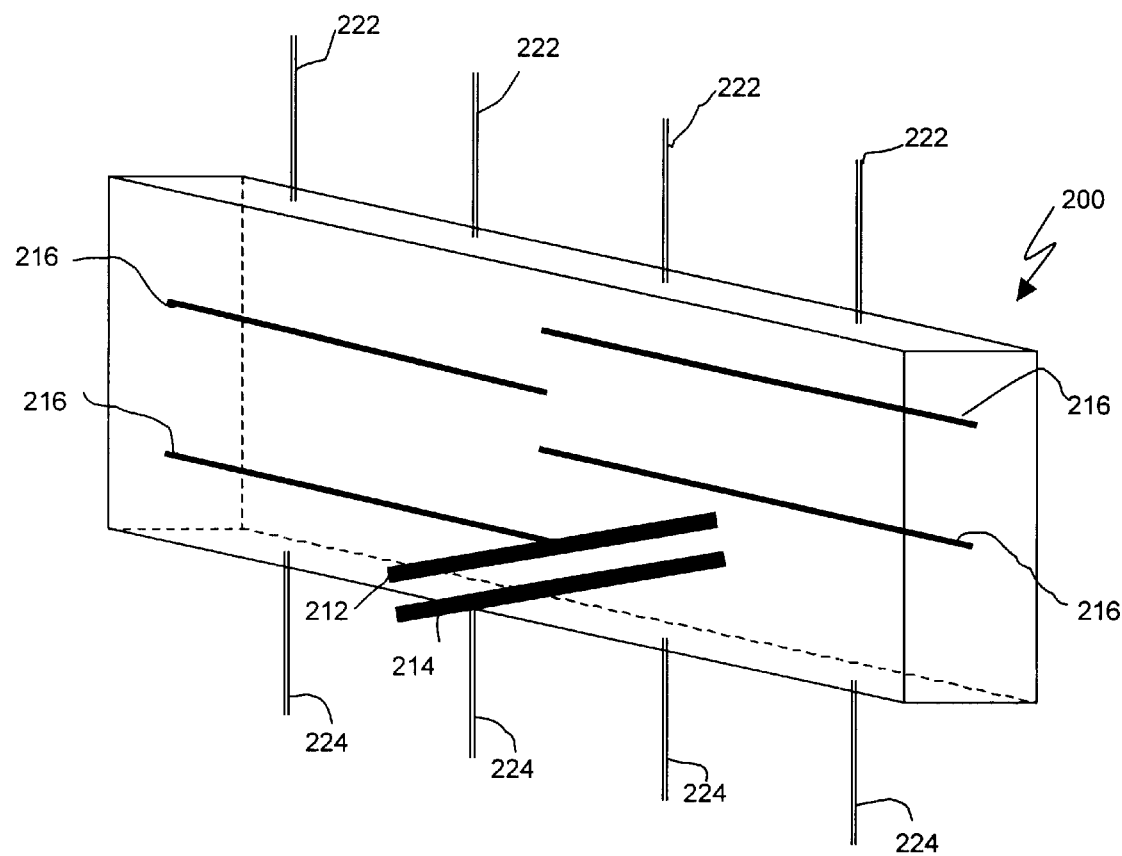
FIG. 11 is an illustration of the test element used in the Example.

A high pressure/high temperature test element was used to test one embodiment of the present invention in a SAGD process. The test element is illustrated in FIG. 11.

The test element 200 was rectangular (80 cm long, 24 cm high and 10 cm wide) with a working volume of 19.2 L. An injection well was simulated by a 1 cm diameter injection tube 212 placed 6 cm from the bottom of the test element 200. A production well was simulated by a 1 cm diameter production tube 214 placed 1 cm from the bottom of the test element 200. The injection and production tubes 212, 214 were perpendicular to and centrally located along the length of the test element 200. Four multipoint thermocouples 216 extending at different heights along the length of the test element 200 were used to monitor temperature in the test element 200. Inlet ports 222 spaced apart at the top of the test element 200 and outlet ports 224 spaced apart at the bottom of the test element 200 were used to saturate the sand in the test element 200 with water and oil, as described more fully below. The test element 200 was then wrapped in a 1.3 cm thick layer of insulation (not shown).

The field time simulated by the test element was estimated using the technique described in Pujol et al. ("Scaling Accuracy of Laboratory Steam Flooding Models" SPE 4191; 1972) and Nasr et al. ("Steamflooding Cold Lake Oil Reservoirs Through a Bottomwater Zone: A Scaled Physical Model Study" SPE 21772; 1991). The techniques described in these papers are generally accepted by those skilled in the art as providing a reasonable estimate of field time. It will be understood by those skilled in the art that, while there may be slight deviations with other techniques, the results are substantially similar.

A scaling factor of 109 was assumed reasonable for scaling time (i.e., 1 minute laboratory time corresponds to 8.25 days in the field). The test element was packed with Ottawa sand having a permeability of 90 Darcy, representing a scaled field permeability of 0.8 Darcy.

The test element 200, at a temperature of 20° C. and 2.1 MPa, was then placed in a pressure vessel (not shown) pressurized with nitrogen at 3.5 MPa to simulate an overburden pressure on the test element 200.

The sand-packed test element 200 was saturated with water by injecting water through the outlet ports 224 to render the sand water-wet. The water in the sand was then displaced through the outlet ports 224 with oil injected through the inlet ports 222 to establish initial oil saturation. The initial oil volume in the test element 200 was 6 L. The oil, containing a dissolved gas ($CH_4$), was a sample from the Cold Lake formation in Alberta, Canada having a viscosity of 32,500 cp at 15° C. The oil with dissolved $CH_4$ simulates a gas-to-oil ratio ("GOR") of 7.2, similar to that found in the field.

Steam (Control) or a steam/solvent mixture (Tests 1 and 2) was injected through the injection tube 212 at a pressure of 2.1 MPa (304.6 psi) and an injection temperature of 215° C. (419° F.).

The Control test was run at an initial steam volume flow rate of 2 L/hr.

Tests 1 and 2 were run using a HIFC comprised of steam and solvent. The solvent was diluent, which primarily contained $C_4$ to $C_{30}$ hydrocarbons, with the $C_5$ to $C_9$ fraction representing about 50% by volume of the diluent.

In Test 1, a HIFC was injected at an initial volume flow rate of 2.15 L/hr (2 L steam/hr+0.15 L diluent/hr) and in Test 2, a HIFC was injected at an initial volume flow rate of 2.3 L/hr (2 L steam/hr+0.3 L diluent/hr). The initial W to S volume ratio, $(W:S)_1$, in the injected HIFC was 13.5:1 (Test 1) and 6.8:1 (Test 2).

S volume ratio in the HIFC was decreased from $(W:S)_1 =$ 13.5:1 to $(W:S)_2 =$ 6.8:1 in Test 1. And the W to S volume ratio in Test 2 was decreased from $(W:S)_1 =$ 6.8:1 to $(W:S)_2 =$ 3.4:1. The injection pressure and temperature for the $(W:S)_2$ HIFC used in Tests 1 and 2 were maintained at 2.1 MPa (304.6 psi) and 215° C. (419° F.), respectively.

The steam volume flow rate for the Control was also reduced by 50%, so that the steam volume flow rate for the Control would be the same as the steam volume flow rate for Tests 1 and 2. Again, the injection pressure and temperature were maintained at 2.1 MPa (304.6 psi) and 215° C. (419° F.), respectively.

The oil recovered from the test element 200 through the production tube 214 was measured and the percent oil recovery, based on the total cumulative volume of oil displaced from the reservoir from t=0, was then calculated after 465 minutes (simulating 10.5 years field time). The results are presented in Table 1 and illustrated in FIG. 12.

TABLE 1

|  | CONTROL | TEST 1 | TEST 2 |
|---|---|---|---|
| $(W:S)_1$ | ∞ (S = 0) | 13.5:1 | 6.8:1 |
| % Oil Recovered from t = 0 to t = 376 min. (simulating 8.5 years field time) | 45% | 51% | 56% |
| Increase in Oil Recovery Relative to Control (t = 0 to t = 376 min) | — | 13% | 24% |
| t = 376 min. | Steam Volume Flow Rate reduced by 50% | | |
| $(W:S)_2$ | ∞ (S = 0) | 6.8:1 | 3.4:1 |
| % Reduction in Total Injection Fluid Volume Flow Rate | 50% | 46% | 44% |
| % Oil Recovered from t = 0 to t = 465 min. (simulating 10.5 years field time) | 47% | 58% | 65% |
| % Oil Recovered from t = 376 to t = 465 min. | 2% | 7% | 9% |
| Increase in Oil Recovery Relative to Control (t = 0 to t = 465 min) | — | 23% | 38% |

In each of the Control and Tests 1 and 2, the fluids were injected into the test element 200 for 376 min., which simulates 8.5 years field time. Oil was produced through the production tube 214. The oil recovered from the test element 200 in each of the Control and Tests 1 and 2 was measured and the percent oil recovery was calculated by dividing the displaced oil volume by the initial oil volume, 6 L, in the test element 200.

Figure 12:
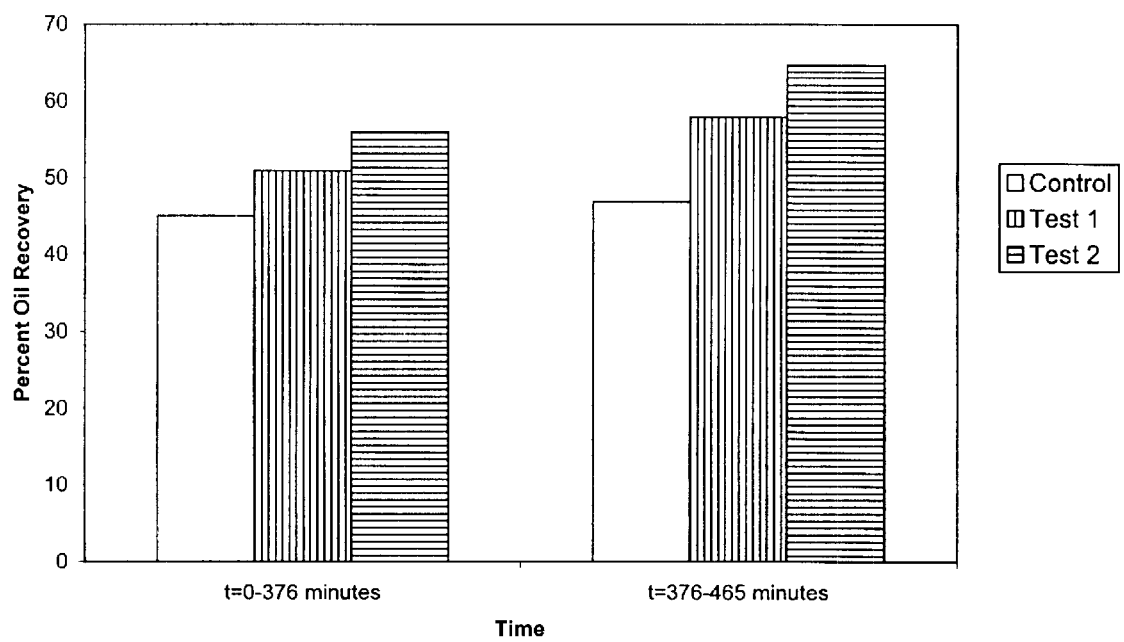
FIG. 12 is a graphical comparison of the percent oil recovery for Control (steam only) and steam-solvent Tests 1 and 2.

FIG. 12 compares the percent oil recovery for the Control and steam-solvent Tests 1 and 2. FIG. 12 shows that at 376 minutes, simulating about 8.5 years field time, the oil recovery for the Control was 45%, while a steam/solvent HIFC increased the oil recovery to 51% in Test 1 and 56% in Test 2. Accordingly, an W to S volume ratio of 13.5:1 (Test 1) increased the percent oil recovery by 13% and an W to S volume ratio of 6.8:1 (Test 2) increased the percent oil recovery by 24%, as compared to the Control. The results are summarized in Table 1 below.

After 376 minutes, which simulates 8.5 years field time, the steam volume flow rate in Tests 1 and 2 was reduced by 50% while maintaining the solvent volume flow rate constant. Therefore, Tests 1 and 2 were conducted using the flow regime illustrated in FIG. 4A, where the solvent volume flow rate is substantially constant and the steam volume flow rate is decreased in a discrete manner. Accordingly, the W to Surprisingly, even though the heat injection into the simulated formation was reduced by 50% (i.e., steam volume flow rate reduced by 50%), the oil recovery increased 7% in Test 1, from 51% to 58%. Moreover, this increased percentage of oil recovered occurred with a 46% reduction in total HIFC injection. And, in Test 2, where the steam volume flow rate was also reduced by 50% and the total HIFC flow rate was reduced by 44%, the percentage oil recovered increased 9% from 56% to 65%. The Test 1 and 2 results are even more surprising when considering that the percentage oil recovered for the Control (steam-only) increased by only 2% in 2 years field time.

The results in Table 1 show a 38% increase in oil recovery for Test 2, as compared with Control and a 23% increase in oil recovery for Test 1, as compared with Control, even though the steam volume flow rate was reduced by 50% in all cases.

FIG. 12 and Table 1 also demonstrate that the percent oil recovery was 12% greater in Test 2, as compared with Test 1.

Table 2 compares the volume of steam and solvent injected per volume of oil produced for the Control, Test 1 and Test 2 in the period t=0 to t=376 minutes (8.5 year simulated field time) and in the period from t=376 to t=465 minutes (additional 2 years simulated field time). The energy injected per produced oil energy was also calculated for each injection period. The energy content for injected steam was determined, using steam tables, to be 2.8 MJ/kg steam injected at 2.1 MPa and 215° C. And the produced oil energy was determined using the heat of combustion for oil having similar properties to the oil used in this example. The oil used in the example is typical of heavy oil found in Alberta, Canada, which typically has a range of 7° to 15° A.P.I. gravity. Accordingly, the calculations in Table 2 use the heat of combustion for a 10° A.P.I. oil: 41.5 MJ/kg oil produced (Maxwell, J. B., *Data Book on Hydrocarbons* Van Nostrand; 1968). The results are graphically illustrated in FIGS. 13 and 14.

the volume of steam injected per volume of oil produced was lower than for the Control, so the energy injected per produced oil energy was reduced to 0.28 (Test 2) from 0.35 (Control).

After the steam volume flow rate was reduced by 50%, the total injected fluid volume decreased to 3.5 volumes per volume oil (2.7 volumes steam plus 0.8 volume solvent). And the ratio of energy injected per produced oil energy dropped to 0.18. The injection fluid required per volume oil produced was about 3.5 times less than for the Control. Moreover, the energy injected was only 20% of the energy injected in the Control.

TABLE 2

|  | CONTROL | TEST 1 | TEST 2 |
|---|---|---|---|
| $(W:S)_1$ | ∞ | 13.5:1 | 6.8:1 |
| Vol. Steam Injected/Vol. Oil Produced from t = 0 to t = 376 min. (simulating 8.5 years field time) | 4.6 | 4.1 | 3.7 |
| Vol. Solvent Injected/Vol. Oil Produced from t = 0 to t = 376 min. | — | 0.3 | 0.6 |
| Total Vol. Injected Fluid/Vol. Oil Produced from t = 0 to t = 376 min, | 4.6 | 4.4 | 4.3 |
| Energy Injected/Produced Oil Energy (t = 0 to t = 376 min.) | 0.35 | 0.3 | 0.28 |
| t = 376 min. | Steam Volume Flow Rate reduced by 50% | | |
| $(W:S)_2$ | ∞ | 6.8:1 | 3.4:1 |
| % Reduction in Total Injection Fluid Volume Flow Rate | 50% | 46% | 44% |
| Vol. Steam Injected/Vol. Oil Produced from t = 376 to t = 465 min. | 12.3 | 3.5 | 2.7 |
| Vol. Solvent Injected/Vol. Oil Produced from t = 376 to t = 465 min. | — | 0.5 | 0.8 |
| Total Vol. Injected Fluid/Vol. Oil from t = 376 to t = 465 min, | 12.3 | 4.0 | 3.5 |
| Energy Injected/Produced Oil Energy (t = 376 to t = 465 min.) | 0.9 | 0.26 | 0.18 |

In the Control, where steam alone was injected, 4.6 volumes steam were required to produce one volume oil in the period t=0 to 376 minutes, simulating 8.5 years field time. Thus, the ratio of energy injected per produced oil energy was 0.35. Once the steam volume flow rate was reduced by 50%, the volume of steam required to produce one volume of oil increased to 12.3 volumes per volume oil produced for two additional years field time. Thus, when the steam volume flow rate was reduced by 50%, the volume of steam required per volume oil increased by about 2.7 times. And the energy injected per produced oil energy increased to 0.9, indicating that recovery was no longer economical.

In Test 1, the total volume of injected fluid was slightly lower at 4.4 volumes/volume oil produced (4.1 volumes steam plus 0.3 volume solvent) in the period t=0 to 376 minutes. Because the volume of steam injected per volume of oil produced was lower than for the Control, the energy injected per produced oil energy was reduced to 0.3 (Test 1) from 0.35 (Control).

At 376 minutes, the volume of steam in the HIFC was reduced by 50%. Surprisingly, the total volume of injected fluid decreased to 4.0 volumes per volume oil produced (3.5 volumes steam plus 0.5 volume solvent). And the ratio of energy injected per produced oil energy dropped to 0.26. Accordingly, the requirement for injection fluid decreased by 3 times compared to Control. Moreover, the energy injected was only 29% of the energy injected in the Control.

And in Test 2, the total injected fluid volume was 4.3 volumes per volume oil produced (3.7 volumes steam plus 0.6 volume solvent) in the period t=0 to 376 minutes. Again, FIG. 14 graphically compares the energy injected per unit of produced oil energy for the Control (steam only) and the steam-solvent Tests 1 and 2. In summary, after the steam volume flow rate was dropped by one-half, the energy input required for the Control (steam-only) increased by 260% per unit of produced oil energy, while the energy input required for Tests 1 and 2 surprisingly and unexpectedly decreased by 13% and 36% per unit of produced oil energy, respectively.

Specifically, the energy required to produce 1 MJ of energy from oil was 0.35 in the $1^{st}$ phase (steam volume flow rate at about 2 L/hr for 0–376 minutes) of the Control. Then, in the $2^{nd}$ phase (steam volume flow rate at about 1 L/hr for 376–465 minutes), the energy input required in the Control increased by 260% to 0.9 MJ per MJ of produced oil energy. Meanwhile, in Tests 1 and 2, the energy input was 14% and 20% less, respectively, than the Control in the $1^{st}$ phase.

Again, surprisingly and unexpectedly, and maybe more significantly, the injection energy requirement trended downward for both Tests 1 and 2, instead of sharply upward as in the Control, when the steam volume flow rate was dropped. In fact, in the $2^{nd}$ phase of Test 1, the energy requirement was only 29% of the energy requirement for the Control. And in the $2^{nd}$ phase of Test 2, the energy requirement dropped even further to 20% of the energy requirement for the Control.

Table 2 shows that the W to S volume ratio was 6.8:1 for both the $1^{st}$ phase of Test 2 (t=0 to 376 minutes) and the $2^{nd}$ phase of Test 1 (t=376 to 465 minutes). But the total injection fluid volume was less for the $2^{nd}$ phase of Test 1. This shows the advantage of reducing the W to S volume ratio at least once.

Figure 13:
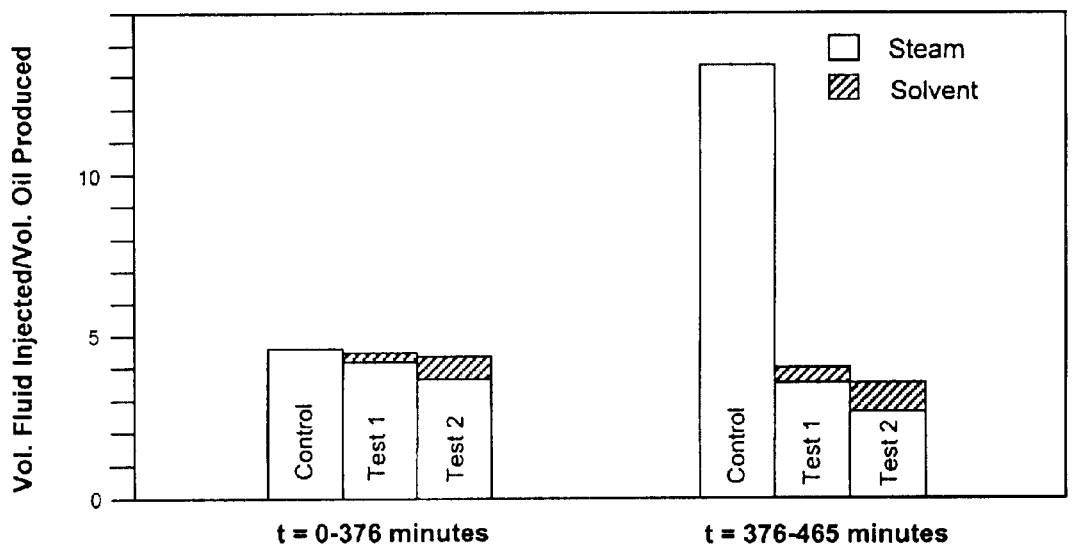
FIG. 13 is a graphical comparison of the volume of injected fluid per volume oil produced for Control (steam only) and steam-solvent Tests 1 and 2.
Figure 14:
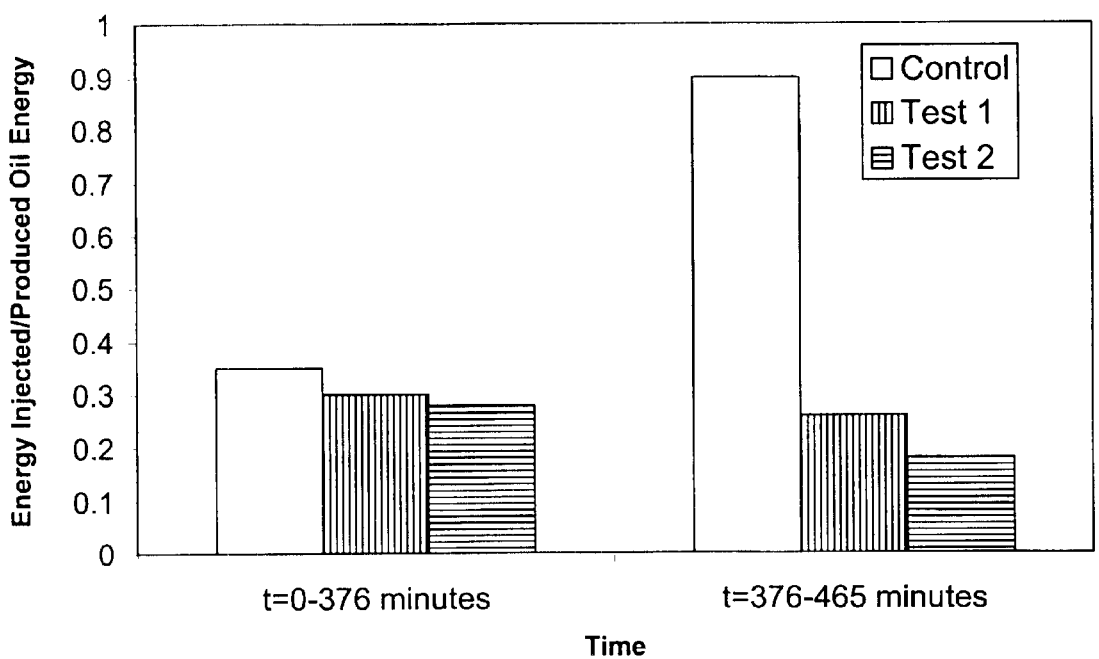
FIG. 14 is a graphical comparison of the energy injected per produced oil energy for Control (steam only) and steam-solvent Tests 1 and 2.

The reason that the results illustrated in FIGS. 12, 13 and 14 and Tables 1 and 2 are surprising is that the percentage oil recovered was expected to drop as the thermal energy injected was reduced. Specifically, as the volume concentration of steam is reduced, the partial pressure of steam in the HIFC is reduced, thereby reducing the steam temperature. Therefore, the injected thermal energy was reduced. Also, the total volume of injected fluid was reduced. It is therefore surprising that the percent oil recovery increased and the volume of injected fluid per volume of oil produced decreased, as the W to S volume ratio was reduced.

As an additional benefit, more than 85% of the injected solvent was recovered in the produced oil. The recovered solvent can be used to assist in pipeline transport of the produced oil and/or can be separated from the produced oil for recycle to the HIFC.

While the Example provides results only for the flow regime embodiment illustrated in FIG. 4A, the inventor reasonably believes that this surprising result can be achieved for other embodiments illustrated in FIGS. 2 to 10B and described above.

Preferred embodiments of the present invention have been described. It will be understood that the foregoing is provided for illustrative purposes only and that other embodiments and applications can be employed without departing from the true scope of the invention described in the following claims.

I claim:

1. A predominantly water-based thermal method for producing hydrocarbons from a subterranean formation having indigenous hydrocarbons, at least one producing means that can communicate with at least a portion of the formation, at least one injection means comprising a wellbore, and a mixing zone in a near-wellbore region of the wellbore, the method comprising:
   (a) selecting a first component, W, and a second component, S, wherein component W is selected from steam, hot water and combinations thereof, and component S is a solvent selected from $C_1$ to $C_{30}$ hydrocarbons, carbon dioxide, carbon monoxide and combinations thereof;
   (b) introducing at least component W and component S into the at least one injection means;
   (c) preparing a heated water-based injection fluid composition before, in or after the at least one injection means, the heated water-based injection fluid composition comprising at least component W and component S in a W to S volume ratio, defined by:

$$(W{:}S)_n = \frac{\text{(volume of component W injected in an injection sequencing interval } n\text{)}}{\text{(volume of component S injected in an injection sequencing interval } n\text{)}}$$

where the total number of injection sequencing intervals is in a range from about 2 to about 12,000,
   wherein the heated water-based injection fluid composition has a first W to S volume ratio, $(W{:}S)_1$, greater than about 5:1 and the volume of component S injected in the first injection sequencing interval, where n=1, is greater than 0;
   (d) changing the ratio, at least once, from $(W{:}S)_1$ to a different W to S volume ratio, $(W{:}S)_n$, wherein at least one $(W{:}S)_n$ than $(W{:}S)_1$ and each $(W{:}S)_n$ is greater than or equal to about 1.5:1; and
   (e) collecting at least a portion of the indigenous hydrocarbons using the at least one producing means.

2. The method of claim 1, wherein the heated water-based injection fluid composition is produced in a mixing region selected from the group consisting of (a) a vessel before the at least one injection means, (b) in-stream before the at least one injection means, (c) in-stream in the at least one injection means, (d) in the mixing zone in the near-wellbore region, and (e) combinations thereof.

3. The method of claim 1 having an injection sequencing interval wherein $(W{:}S)_{n+1}$ is less than $(W{:}S)_n$ and each subsequent W to S volume ratio is different and lower than the preceding ratio with each W to S volume ratio being greater than or equal to about 1.5:1.

4. The method of claim 3 having at least one injection sequencing interval wherein at least one $(W{:}S)_{n'+x}$, where x is in the range from 1 to 5, is greater than $(W{:}S)_{n'}$ and $(W{:}S)_{n'+x+1}$ is less than $(W{:}S)_{n'}$ with each W to S volume ratio being greater than or equal to about 1.5:1, and the volume of component S injected in the n'+x injection sequencing interval is greater than or equal to 0.

5. The method of claim 1 having at least one injection sequencing interval wherein at least one $(W{:}S)_{n+x}$, where x is in the range from 1 to 5, is greater than $(W{:}S)_n$ and $(W{:}S)_{n+x+1}$ is less than $(W{:}S)_n$ with each W to S volume ratio being greater than or equal to about 1.5:1, and the volume of component S injected in the n+x injection sequencing interval is greater than or equal to 0.

6. The method of claim 5 having an injection sequencing interval wherein $(W{:}S)_{n'+1}$ is less than $(W{:}S)_{n'}$ and each subsequent W to S volume ratio is different and lower than the preceding ratio with each W to S volume ratio being greater than or equal to about 1.5:1.

7. The method of claim 1 wherein $(W{:}S)_1$ is in a range from about 5:1 to about 100:1.

8. The method of claim 1 wherein $(W{:}S)_1$ is in a range from about 5:1 to about 50:1.

9. The method of claim 1 wherein $(W{:}S)_1$ is in a range from about 10:1 to about 25:1.

10. The method of claim 1 wherein n is in a range from about 3 to about 6,000.

11. The method of claim 1 wherein the W to S volume ratio is changed by decreasing the volume flow rate of component W, increasing the volume flow rate of component S, or a combination thereof.

12. The method of claim 11 wherein the volume flow rate of component W is decreased by a discrete injection sequencing interval, a substantially continuous injection sequencing interval, a continuous injection sequencing interval or a combination thereof.

13. The method of claim 11 wherein the volume flow rate of component S is increased by a discrete injection sequencing interval, a substantially continuous injection sequencing interval, a continuous injection sequencing interval or a combination thereof.

14. The method of claim 13 wherein the volume flow rate of component S is increased in the same injection sequencing interval, a different injection sequencing interval, or a combination thereof.

15. The method of claim 1 wherein the $C_1$ to $C_{30}$ hydrocarbon is selected from the group consisting of methane, ethane, propane, butane, pentane, hexane, heptane, octane, nonane, decane, undecane, dodecane, tridecane, tetradecane, and combinations thereof.

16. The method of claim 1 wherein the $C_1$ to $C_{30}$ hydrocarbon is a mixture selected from the group consisting of diluent, kerosene, petroleum naphtha, heavy coal tar naphtha, solvent coal tar naphtha and combinations thereof.

17. The method of claim 1 wherein the $C_1$ to $C_{30}$ hydrocarbon is selected from the group consisting of xylene, toluene, benzene and combinations thereof.

18. The method of claim 1 wherein steps (a) to (e) are conducted following a hydrocarbon-producing method selected from the group consisting of a substantially solvent-based method, a substantially steam-based method, a substantially hot water-based method, a combined steam and solvent method, or a combined hot water and solvent method.

19. The method of claim 1 wherein steps (a) to (e) are conducted prior to a hydrocarbon-producing method selected from the group consisting of a substantially solvent-based method, a substantially steam-based method, a substantially hot water-based method, a combined steam and solvent method, or a combined hot water and solvent method.

20. The method of claim 1 further comprising the step of (f) discontinuing injection of component W.

21. The method of claim 1 wherein the method is used in a steam-based or hot water-based hydrocarbon producing process.

22. The method of claim 21 wherein the steam-based hydrocarbon producing process is a steam assisted gravity drainage process.

23. The method of claim 21 wherein the steam-based hydrocarbon producing process is a cyclic steam stimulation process.

24. The method of claim 21 wherein the steam-based hydrocarbon producing process is a steam flooding process.

25. The method of claim 21 wherein the hot water-based hydrocarbon producing process is a hot-water flooding process.

26. The method of claim 1 wherein the produced indigenous hydrocarbons contain at least a portion of injected component S.

27. The method of claim 26 wherein at least a portion of component S is recovered from the produced indigenous hydrocarbons.

28. The method of claim 27 wherein the recovered component S is recycled to the heated injection fluid composition.

29. The method of claim 1 wherein the producing means and the injection means are disposed in a single wellbore.

30. The method of claim 1 wherein the producing means is disposed in at least a first wellbore and the injection means is disposed in at least a second wellbore.

* * * * *